Jan. 19, 1971  MIAKI YAMAMOTO ETAL  3,555,899
ULTRASONIC FLOW QUANTITY MEASURING SYSTEM
Filed Oct. 24, 1967
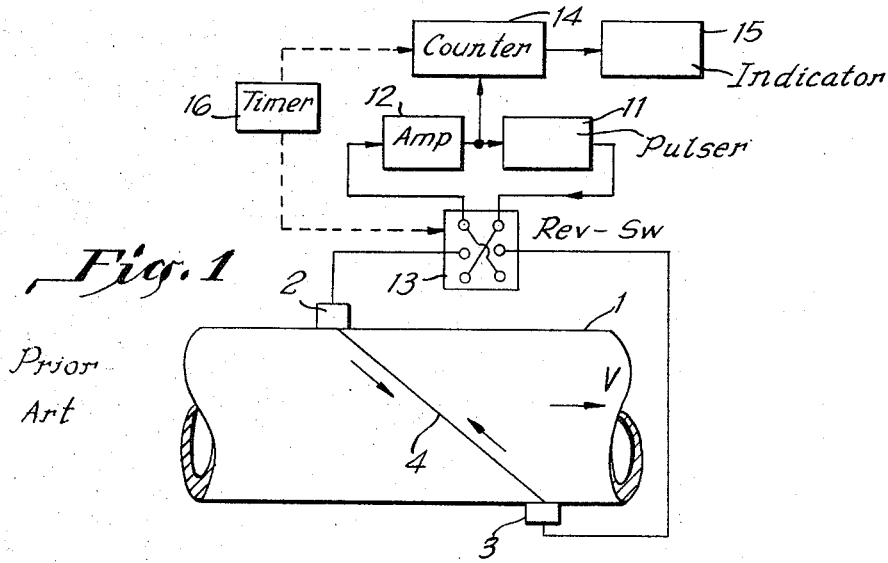
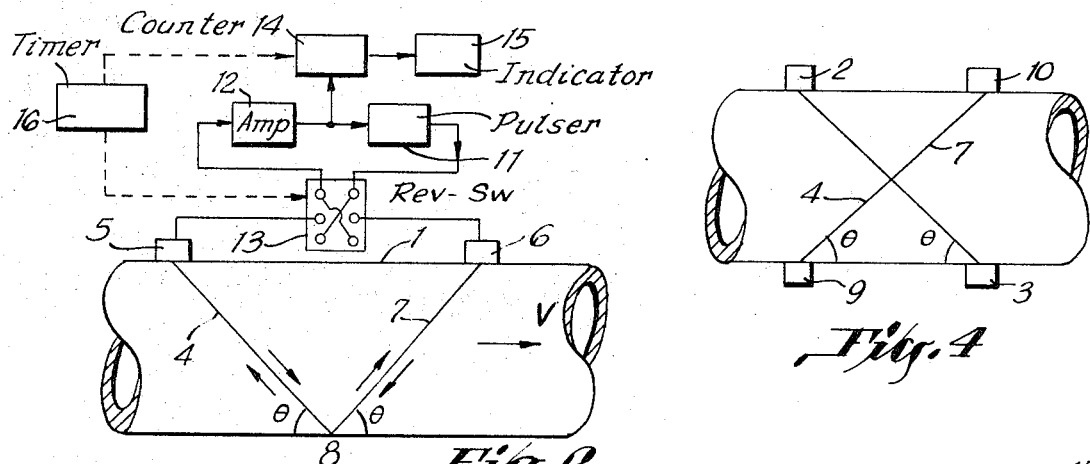
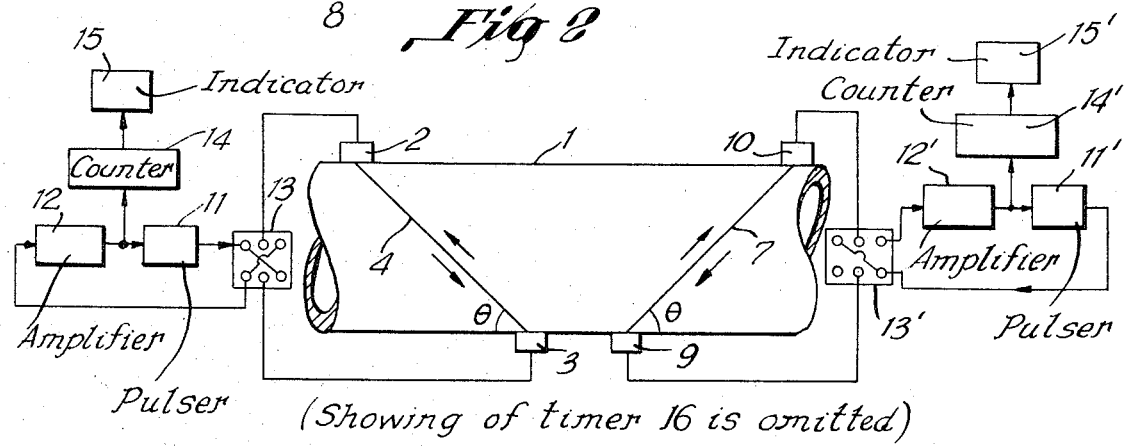
INVENTORS
Miaki Yamamoto
Shin Amano United States Patent Office 3,555,899
Patented Jan. 19, 1971

3,555,899
ULTRASONIC FLOW QUANTITY
MEASURING SYSTEM
Miaki Yamamoto and Shin Amano, Tokyo, Japan, assignors to Tokyo Keiki Seizosho Company, Ltd., Tokyo, Japan, a corporation of Japan
Filed Oct. 24, 1967, Ser. No. 677,656
Claims priority, application Japan, Nov. 1, 1966, 41/72,060
Int. Cl. G01p 5/00
U.S. Cl. 73—194                2 Claims

ABSTRACT OF THE DISCLOSURE

An apparatus for ultrasonically measuring the quantity of flow of a liquid in a conduit. Means for producing two ultrasonic propagation paths between opposite side walls of the conduit, the means for propagating said paths being disposed in a plane containing two parallel longitudinal straight lines and with inclinations in a mutually supplementary relation to said two lines. The apparatus includes means for propagating ultrasonic waves in both directions forth and back in each of the two paths aforesaid. Flow is determined by measuring the propagation speeds in the downstream and upstream directions and calculating the average value of the differences between said different speeds. One can, and preferably does, provide the ultrasonic waves in one path by reflection of the ultrasonic waves in the other path.

The invention relates to an apparatus for ultrasonically measuring the flow of liquid through a conduit.

Previously, when flow quantity of a fluid flowing in a pipe was to be measured by an ultrasonic flow meter, the direction of the fluid flow has been assumed to always coincide with the direction of the central axis of the pipe, and an average flow speed through the whole propagation path of an ultrasonic beam provided obliquely to the flow direction has been measured to obtain the flow quantity by taking the measured value itself. This assumption, however, is not valid when a straight pipe portion in which the propagation path of ultrasonic beam is set up is connected adjacent to a curved pipe portion, because in this case the flow direction no longer coincides with the pipe axis direction owing to meandering of flow caused by the pipe curvature. Consequently the above-mentioned simple measurement system very often introduces a considerable error in the measured flow quantity.

The invention has for its object to eliminate the errors introduced when the direction of fluid flow deviates from the direction of the central axis of the pipe. To accomplish it, a pair of ultrasonic beam propagation paths, always in combination, are provided obliquely to the pipe axis direction with inclinations in a mutually supplementary relation, and the system is so constructed that there is measured a mean value of fluid flow speeds determined by each of the paths. According to the construction, errors caused by deviations of the fluid flow direction from the pipe axis direction cancel each other, with the result that an accurate flow speed component can always be measured.

The invention will now be described in greater detail and with reference to the accompanying drawing, in which FIG. 1 is a diagrammatic view of a conventional and simple ultrasonic flow quantity measurement system;

FIG. 2 is a diagrammatic view of an embodiment of the present invention; and

FIGS. 3 and 4 are diagrammatic views of two other different embodiments of the present invention.

Referring to the drawing, in FIG. 1, numeral 1 designates a pipe which conducts a fluid to be measured, and numerals 2 and 3 designate a pair of transducers (hereinunder noted simply as "TR"). TR2 and TR3 are secured to the pipe 1 on diametrically opposite straight lines on the pipe wall so that an ultrasonic propagation path 4 connecting them is inclined obliquely to the axial direction of pipe 1. The inclination angle is taken as $\theta$ and the length of path 4 as $l$. In the measuring system, 11 is a pulser, 12 is an amplifier, and 13 is a reversing switch connected to pulser 11, probe or transducer 2, probe or transducer 3 and amplifier 12. Amplifier 12 is connected to pulser 11 and also to a counter 14, which latter is connected to an indicator 15. As is shown in FIG. 1, a timer 16 is connected to reversing switch 13 and also to counter 14.

In the prior art assembly, FIG. 1, the "pulser" 11 emits a pulse immediately upon receiving a pulse from the amplifier 12. If the reversing switch 13 is turned downwards, the pulse from pulser 11 is transmitted to the probe or transducer 2, and the pulse from probe 3 is transmitted to amplifier 12. Thus $11 \rightarrow 2 \rightarrow 4 \rightarrow 3 \rightarrow 12 \rightarrow 11$ constitutes a sing-around system, and the pulse repetition rate of the system depends on the acoustic transmission speed of ultrasonic waves in the path 4 in the concerned direction. When the switch 13 is turned upwards, the direction of transmission of ultrasonic waves in path 4 will be reversed.

The output of amplifier 12 is connected to the reversible or additive and subtractive pulse counter 14. The timer 16 transmits pulses periodically and simultaneously to switch 13 and counter 14, and each of the pulses at one side turns switch 13 reversely and at the other side converts the counting of counter 14 from addition to subtraction or in the reverse direction. When switch 13 is downward the counting is additive and when switch 13 is upward the counting is subtractive. The result of pulse counting is given to indicator 15.

In the apparatus shown in FIG. 1, the pipe 1 forms a straight pipe portion, and the pipe wall may be considered as the aggregation of an infinite number of straight lines parallel to the pipe axis direction. It is assumed, however, that closely adjacent to the straight pipe portion on its left or right side there is connected a curved pipe portion, for example a portion which is curved rectangularly. Then, if the direction and flow speed or velocity of the fluid flow in pipe 1 is V, the direction of V does not always coincide with that of the pipe axis, the angle between them being taken as $\epsilon$.

In an embodiment, TR2 and TR3 are assumed to be connected in a sing-around system. Namely, during a period TR2 is connected as a transmitter to an ultrasonic transceiver so as to transmit, upon receiving the latter's output electric pulses, ultrasonic pulses through path 4 to TR3, which latter acts as a receiver to convert the ultrasonic pulses to electric pulses and to transmit the latter to the transceiver, which in turn, upon receiving the electric pulses, immediately transmits electric pulses to TR2. Thus an automatic ultrasonic cycling path is formed, in which the frequency or number of pulses in a definite time of the electric pulses which the transceiver receives from TR3 is proportional to the propagation speed of the ultrasonic waves from TR2 to TR3 in the direction along to the fluid flow. During the next period, TR2 and TR3 are reversely switched in regard to transmission and reception to form a similar automatic ultrasonic cycling path. In this case, the frequency of the transceiver's receiving pulses is proportional to the propagation speed of the ultrasonic waves from TR3 to TR2 in the direction against the fluid flow. Since the ultrasonic wave propagation speed in the along-flow or down-stream direction is equal to the sum of the propagation speed $c$ when the flow speed would be zero and the component of the flow velocity V in the direction of the line 4, and the propagation speed in the against-flow or up-stream direction is equal to the difference between them, the flow velocity V can be measured by taking the difference between the ultrasonic wave propagation speeds in the down-stream and up-stream directions.

Now, in FIG. 1, if we assume $\epsilon=0$, the ultrasonic reception frequency $f_1$ in the down-stream direction and the frequency $f_2$ in the up-stream direction are:

$$f_1 = \frac{c+V \cos \theta}{l}, \quad f_2 = \frac{c-V \cos \theta}{l}$$

Therefore, $$f_1 - f_2 = \frac{2V \cos \theta}{l}$$

Here, since both $l$ and $\theta$ are known, we can obtain V from $f_1-f_2$.

Whereas, if $\epsilon$ is not zero, it comes to the following.

$$f_1 = \frac{c+V \cos (\theta+\epsilon)}{l}, \quad f_2 = \frac{c-V \cos (\theta+\epsilon)}{l}$$

Therefore, $$f_1 - f_2 = \frac{2V}{l} \cos (\theta+\epsilon)$$

Now, if we take the component of V in the pipe axis direction $V \cos \epsilon = v$, and the component in the transverse direction $V \sin \epsilon = u$, then $$f_1 - f_2 = \frac{2}{l} (v \cos \theta - u \sin \theta)$$

Here, since the true value of flow quantity must be $v \times$ the cross sectional area, $u \sin \theta$ relative to $v \cos \theta$ in the above expression presents itself as an error.

In FIG. 2 which shows an embodiment of the invention, TR5 and 6 are secured to the pipe wall on a straight line parallel to the pipe axis direction and located so that ultrasonic pulses emitted from TR5 in the direction at an angle $\theta$ to the pipe axis are reflected at a point 8 on the opposite wall inner surface and the reflected waves 7 just reach TR6. Further, TR5 and 6 are arranged in a sing-around system similar as TR2 and 3 in FIG. 1 both in the down- and up-stream directions, and by measuring the difference between the down-stream frequency $f_3$ and the up-stream frequency $f_4$, we can obtain the desired true flow velocity component $v$ for the following reason.

In FIG. 2 the added means including the sing-around system and the reversible pulse counting system is the same as that in FIG. 1, but two paths 4 and 7 are provided, of which one path 7 or 4 is made by reflection of the other path 4 or 7 at the point 8. In this embodiment, a single measuring system the same as that in FIG. 1 is used common to the two paths 4 and 7, for measuring an average value of differences between propagation speeds or times in downstream direction and upstream direction for either of these two paths. In case of FIG. 2 it will be obvious that the output of counter 14 gives the average of said differences (between downstream and upstream) of the two paths 4 and 7.

In this case, it is to be noted that the intersection angle of the direction of flow velocity V with that of the path 4 is $\theta+\epsilon$, while the intersection angle of the direction of flow velocity V with that of the reflected path 7 is $\theta-\epsilon$. Therefore, if we show it in expressions, it comes to the following. First, if the time taken for ultrasonic pulses to travel from TR5 through paths 4 and 7 to TR6 be $t_3$ and the time in the reverse direction be $t_4$, then $$t_3 = \frac{l}{c+V \cos (\theta+\epsilon)} + \frac{l}{c+V \cos (\theta-\epsilon)}$$

$$= \frac{2l(c+V \cos \theta \cdot \cos \epsilon)}{c^2+2V \cos \theta \cdot \cos \epsilon + V^2 (\cos^2 \theta \cos^2 \epsilon - \sin^2 \theta \sin^2 \epsilon)}$$

Substituting therein the above $v=V \cos \epsilon$ and $u=V \sin \epsilon$, we obtain $$t_3 = \frac{2l(c+v \cos \theta)}{(c+v \cos \theta)^2 - u^2 \sin^2 \theta}$$

Here, since $v$ is very small as compared with $c$ and $u$ is even smaller considerably than said $v$, conclusively $u \sin \theta$ is remarkably smaller than $c+v \cos \theta$ and may be omitted. Then the following result is obtained.

$$t_3 = \frac{2l}{c+v \cos \theta}$$

Similarly, $$t_4 = \frac{l}{c-V \cos (\theta+\epsilon)} + \frac{l}{c-V \cos (\theta-\epsilon)}$$

$$= \frac{2l(c-v \cos \theta)}{(c-v \cos \theta)^2 - u^2 \sin^2 \theta}$$

Here also, since $u \sin \theta$ is remarkably smaller than $c-v \cos \theta$, the following result is obtained.

$$t_4 = \frac{2l}{c-v \cos \theta}$$

Therefore, $f_3$ and $f_4$ are as follows.

$$f_3 = \frac{c+v \cos \theta}{2l}$$

$$f_4 = \frac{c-v \cos \theta}{2l}$$

Therefore, $$f_3 - f_4 = \frac{v}{l} \cos \theta$$

In the above description is was assumed that the direction of flow velocity V is located in the plane containing the ultrasonic paths 4 and 7. If V is in the direction deviated from the plane, considering the general case, then we will take the pipe axis direction as $x$, its transverse direction in the plane of straight lines 4 and 7 as $y$, and the direction perpendicular to those two as $z$, and components of V in those three directions as V$x$, V$y$ and V$z$. Then, in obtaining the intersection angle $\phi$ of flow velocity V with straight line 4, and the intersection angle $\Psi$ of flow velocity V with straight line 7, since in general the intersection angle of two straight lines the direction cosines of which are $(l_1, m_1, n_1)$ and $(l_2, m_2, n_2)$ respectively, is equal to $l_1 l_2 + m_1 m_2 + n_1 n_2$, it follows that $\cos \phi = Vx/V \cos \theta + Vy/V \sin \theta + Vz/V \cos 90°$
$\cos \Psi = Xx/V \cos \theta + Vy/V \sin \theta + Vz/V \cos 90°$ Therefore, $V \cos \phi = Vx \cos \theta - Vy \sin \theta$
$V \cos \psi = Vx \cos \theta + Vy \sin \theta$ Then, if we obtain the above mentioned $t_3$, $t_4$ and $f_3$, $f_4$ in regard to this case, it follows that $$t_3 = \frac{l}{c+(Vx \cos \theta - Vy \sin \theta)} + \frac{l}{c+(Vx \cos \theta + Vy \sin \theta)}$$

$$t_4 = \frac{l}{c-(Vx \cos \theta - Vy \sin \theta)} + \frac{l}{c-(Vx \cos \theta + Vy \sin \theta)}$$

In this case also, quite similarly as above stated, $Vy \sin \theta$ is very small as compared with $c \pm Vx \cos \theta$, therefore it may be omitted. Then we obtain the following result.

$$t_3 = \frac{2l}{c+Vx \cos \theta}$$

$$t_4 = \frac{2l}{c - V_x \cos \theta}$$

$$f_3 = \frac{c + V_x \cos \theta}{2l}$$

$$f_4 = \frac{c - V_x \cos \theta}{2l}$$

Therefore, $$f_3 - f_4 = \frac{V_x}{2l} \cos \theta$$

When this $V_x$ is multiplied by the cross sectional area, we can obtain the true flow quantity.

FIG. 3 shows an embodiment in which two ultrasonic propagation paths 4 and 7 in FIG. 2 are separated, and two independent sets of sing-around system, namely one set of TR2 and 3 and the other TR9 and 10, are provided. In FIG. 3 the systems 11-to-15 and 11'-to-15' are identical with that shown in FIG. 2, but a timer 16 has not been shown. In this embodiment the average (between downstream and upstream) propagation speed is ascertained by calculation, or by introducing the outputs of counters 14 and 14' into an additive counter. In this case, the inclinations of the paths 4 and 7 to the pipe axis direction should be in a supplementary relation, namely if one of them is $\theta$, the other should be $\pi - \theta$ relative to the safe reference direction. Further, in this case, the straight line of path 7 should be selected so as to exist in the plaine which contains two straight lines in the pipe axis direction passing through both ends of path 4 or TR2 and 3. Then, if now we take the sing-around frequency from TR2 to TR3 as $f_5$, that from TR3 to TR2 as $f_6$ that from TR9 to TR 10 as $f_7$ and that from TR10 to TR9 as $f_8$, then $$f_5 - f_6 = \frac{2}{l} (v \cos \theta - u \sin \theta)$$

$$f_7 - f_8 = \frac{2}{l} (v \cos \theta + u \sin \theta)$$

Therefore, when we take their sum, it follows that $$(f_5 - f_6) + (f_7 - f_8) = \frac{V}{l} \cos \theta$$

their average being half of the sum. Further, also when V is resolved into three components $V_x$, $V_y$ and $V_z$ we need only substitute $X_x$ and $X_y$ in place of $v$ and $u$ as mentioned above, respectively.

Another embodiment shown in FIG. 4 is quite similar to one shown in FIG. 3 except that the path 7 is shifted to a position where it interesects the path 4. The systems 11-to-15 and 11'-to-15' shown in FIG. 3 are appurtenant also to this figure.

Although in the above-mentioned embodiments we considered the case where the fluid to be measured is conducted in a pipe of circular cross section, the invention is not limited to it, but may be also applied to such cases that in general we use a vessel having parallel opposite walls or channels with one face open, or other similar fluid conduits. Further, the invention is not limited to the case where the sing-around method is used, but may also be applied to such cases where other methods such as the phase difference method (including the simultaneous transmission and reception type) or the pulse propagation time difference method are used. In all those cases, according to the invention, errors due to the fact that the direction of fluid velocity does not coincide with that of pipe axis are corrected and the accurate value of flow quantity can be measured.

We claim:

1. An ultrasonic flow quantity measurement system comprising means providing two ultrasonic propagation paths between two opposite side walls of a flow conduit, in a plane containing two parallel longitudinal straight lines in the walls and with inclinations in a mutually supplementary relation to the two lines; means for providing propagation of ultrasonic waves in both directions forth and back in each of the two paths; and means for measuring an average value of differences between propagation speeds or times in the downstream direction and in the upstream direction for either of said two paths.

2. An ultrasonic flow quantity measurement system according to claim 1, in which the ultrasonic waves in one path are provided by reflection of the ultrasonic waves in the other path at a point on the walls.

References Cited

UNITED STATES PATENTS

| | | | |
|---|---|---|---|
| 2,669,121 | 2/1954 | Garman et al. | 73—194 |
| 2,931,223 | 4/1960 | Kritz | 73—194 |
| 2,991,650 | 7/1961 | Katzenstein et al. | 73—194 |
| 3,145,564 | 8/1964 | Poole et al. | 73—194 |
| 3,336,801 | 8/1967 | Snavely | 73—194X |
| 2,515,221 | 7/1950 | Henning | 73—194X |

CHARLES A. RUEHL, Primary Examiner